3,419,416
PREVENTION OF CAKING IN HIGH TEMPERATURE FLUIDIZATION PROCESSES

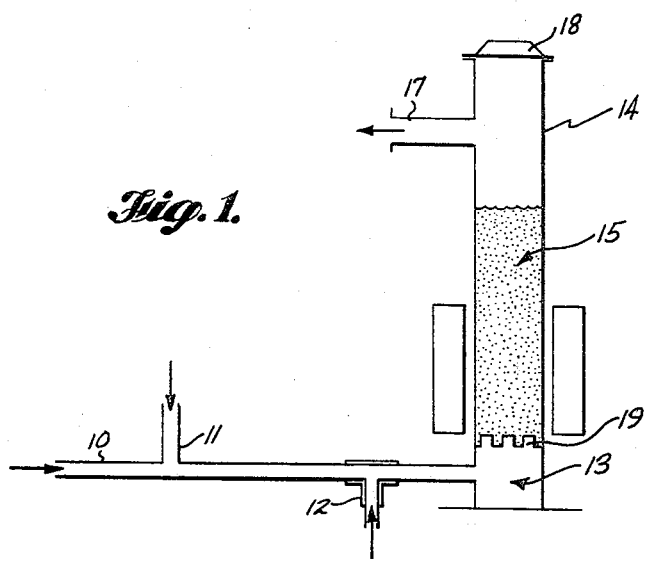
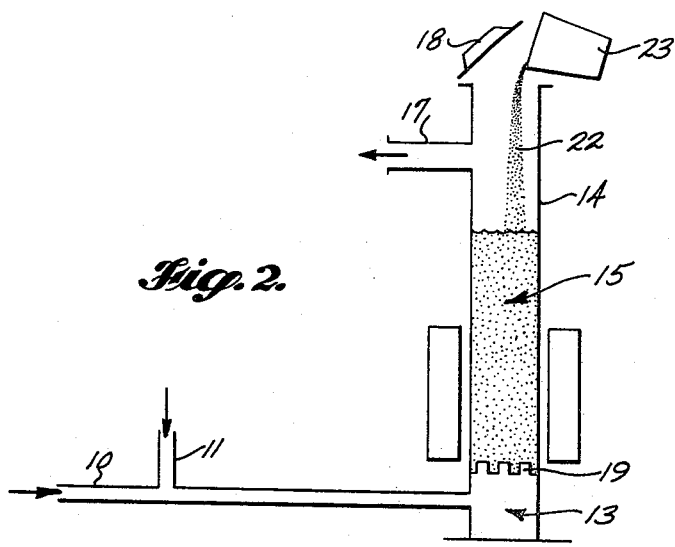
INVENTORS
WALTER BATIUK
CHARLES JUNG
BY FRANK MORGAN
AGENT

Walter Batiuk and Charles H. Jung, Seattle, and Frank W. Morgan, Enumclaw, Wash., assignors to The Boeing Company, Seattle, Wash., a corporation of Delaware
Filed Nov. 18, 1964, Ser. No. 411,972
3 Claims. (Cl. 117—106)

ABSTRACT OF THE DISCLOSURE

In a high temperature fluidization bed containing silicon particles used for siliconizing metals introduced therein, a method for preventing the agglomeration of the silicon particles by introducing air, oxygen, nitrogen, or a mixture thereof, or a solid material which yields oxygen or nitrogen, and reacting the gas with the silicon particles to partially coat the particles with an antifriction coating.

---

This invention relates in general to a method of preventing caking in high temperature fluidization processes and more particularly to a method of coating particles in a fluidized bed so that the particles have a low coefficient of friction upon their surfaces.

Initial description concerning this invention will depart from the invention so as to briefly describe the environment within which the invention is used. The fluidized bed, in its simplest form, comprises a container holding a bed of powder supported on a permeable plate forming port of a diffusion plenum. When a gas is passed upward through the powder, a pressure differentional is established across the bed. This pressure differential increases with increases in the flow rate until it is equal to the hydrostatic weight of the bed. The bed then expands, causing the particles to lose contact with one another and become fluid by being suspended. In this state, the bed is said to be fluidized.

A typical material used in a fluidized bed is silicon metal and in the conventional manner the silicon is fluidized with an inert gas, an example of such gas being argon. The reactive gas for forming a volatile compound with the silicon is introduced with the fluidizing gas at the coating stage in the operation, either by injecting it directly into the diffusion plenum or by injecting it indirectly into the inner gas supply duct. In the preferred manner of operating the fluidized bed, a halogen gas is used, although any gas which will react with silicon to form a volatile compound thereafter decomposable at elevated temperatures to release the silicon to form a disilicide diffusion complex on the metal base will suffice.

Siliconization of metals and alloys in the fluidized bed system at temperatures above 1450° F. has been plagued by the intermittent "caking" of the silicon powder in the fluidized bed process. This "caking" condition has been a serious obstacle toward achieving the advantages of the fluidized bed process under the above temperature conditions. The "caking" condition, when it becomes quite pronounced, can cause the bed temperature to become erratic. Such a condition, if left uncured, can be serious enough to damage the reactor walls. Such a condition could also have serious effects upon any proposed long runs of the fluidization process. In the past in order to continue siliconizing under such adverse "caking" conditions, the "caked" silicon had to be broken up mechanically which incurred additional operating expense and extension of the time required for processing parts. The instant invention provides a simple, inexpensive and novel solution to the above described problem of caking conditions in a fluidization process. In addition the instant invention has the advantage that the fluidized bed can be maintained indefinitely in the fluidized state.

In light of the above description it is an object of this invention to prevent the caking problem in a fluidization process.

It is another object of this invention to prevent damage to a fluidized bed during operation under conditions which promote caking.

It is still another object of this invention to prevent time loss in the fluidization process due to mechanical removal of caked silicon and the time lost in idling a fluidized bed system during such removal.

It is another object of this invention to continuously provide for the smooth uniform flow of particles within a fluidized bed during high temperature processes.

Other objects and advantages of the instant invention will become apparent from the following specification, the appended claims and the drawings wherein:

FIGURE 1 represents a fluidized bed with an inflow line;

FIGURE 2 represents the arrangement shown in FIGURE 1 when a solid addition is being made to the fluidized bed system; and FIGURE 3 represents a comparison of the silicon particle before application of the process of the instant invention and the silicon particle after application of the process in the instant invention.

In the broad sense the instant invention comprises a method of injecting into a fluidized bed, which is or is not in the process of coating an article, a material which will form a surface film on the silicon particles within the fluidized bed, thus serving to lubricate said particles with respect to each other and to reduce the friction between said particles. In more detail the instant invention can be described as the process of injecting into a fluidized bed a gaseous component with the second step consisting of reacting said gaseous component with the silicon particles in the bed. A variation of the instant invention can be described as the process of injecting into the fluidized bed a solid component with the second step consisting of reacting said solid component with the silicon particles in the bed. The reaction is carried out so as to form a layer on a portion of the surface of each silicon particle, but the layer does not entirely cover the surface of each silicon particle.

A detailed embodiment of the practice of this invention is shown in FIGURE 1 wherein a supply line 10 feeds into the plenum chamber 13 at the bottom of the fluidized bed 14. The supply line 10 carries argon, with other processing additions being made at inserts 11 and 12 in the supply line 10. At the inert 11 a reactive gaseous material is added. At insert 12 an addition is intermittently made to the supply line of a gaseous medium such as air, oxygen, nitrogen or other gases and mixtures thereof, which when reacted with silicon will form a non-caking coating. This supply is fed into the main line 10 through insert 12 as it is needed to prevent caking in the fluidized bed system. During operation of the fluidized bed there is a flow of argon and/or other inert gases along with a reactive gaseous medium at insert 11 which gases are needed in the operation of the fluidized bed. However, in between coating runs with a silicon medium, which medium forms a disilicide layer on an article, the fluidized bed has to be maintained in such a condition as to prevent the problem of caking, which problem in essence amounts to the adhesion of the silicon particles to the container walls 14 of the fluidized bed system and, at the same time, adhesion to other silicon particles. During the time that the fluidized bed is not being used to coat an article with a disilicide layer the instant invention can be employed to prevent the problem of caking. Also where certain gases would not be detrimental to the coating of an article with a disilicide or equivalent medium, and where these gases would prevent caking in the fluidized bed during actual operation, certain gases are introduced during the actual operation of the fluidized bed to prevent caking and to eliminate any caked condition.

The practice of this invention is as follows. The argon or other inert gas is fed into the inflow line (or lines) as normally done during processing. No reactive material would be inserted at point 11 because there is no processing currently being done. At insert 12, air, oxygen, nitrogen or other possible reactive gaseous media and mixtures thereof can be inserted in controlled proportions into the argon supply line. The main supply line 10 feeds into the plenum chamber 13 of the fluidized bed 14. The gas enters through the openings in the partition 19 and goes through the silicon bed 15 in its normal flow pattern. The flow of the reactive medium into the main argon line 10 is made in such a manner as not to react all of the surface areas of the particles within the silicon bed 15, but is made in such a manner that only a part of the surface areas of the silicon particles are reacted with a compound upon their surface which compound does not cover the entire surface of the silicon particle. The reaction product is amply demonstrated by FIGURE 3 in which a comparison is made between a silicon particle 30 before the reaction and a silicon particle 31 after the reaction taught by the instant invention. As previously noted, where the reactive addition does not interfere with the coating operation of the fluidized bed, then the practice of this invention can be performed during the operation of the fluidized bed. Therefore it can be seen from the above description that this invention is carried out by coating only a portion of the silicon particles within the fluidized bed on only a portion of the surface of each particle so that no caking occurs, and after the idling time has expired and it is desired again to use the fluidized bed there will be many silicon particles which will be capable of reacting with reactant materials inserted at insert 11 so as to again produce a medium capable of depositing disilicide compounds on the articles inserted through the cap 18 of the fluidized bed.

FIGURE 2 shows an alternative method of practicing the instant invention where a solid media is added to the fluidized bed at the top of the bed from a container 23. The solid media in the practice of this invention could be an oxygen or nitrogen generating medium.

At this time certain processing sequences should be described so as to complete the details of the instant invention. A typical medium to be inserted into the argon line at insert 12 in practice of this invention is air. A representative rate of flow of the air would be so that the air is 35% of the total gas flow (argon and air). The air is injected at temperatures in the range of the actual temperature of the fluidized bed during processing which temperature is normally greater than 1400° F. Normal temperatures during this conditioning has been found to be 1800 to 1900° F. The air is injected as a remedial measure when caking has become a problem or as a precautionary measure after every 20 hours of coating time to prevent caking from occurring during actual coating processes. The facility requirements for such a system to carry out the practice of the instant invention entails having filters (not shown) to remove any foreign matter from the air or other medium inserted at insert 12 in the main argon line. Flow meters (not shown) are used to control and measure the air flow being inserted into the main argon line. Completing the facility requirements are pressure regulators (not shown) and pressure gauges (not shown) to control the air supply for insert 12.

Certain procedures should be practiced in the utilization of this invention. The air or other media to be injected at insert 12 must not be injected while the part to be coated with the disilicide layers are in the bed. However, where certain gases would not be detrimental to the coating of an article with a disilicide or equivalent medium, and where these gases would prevent caking in the fluidized bed during actual operation, certain gases are introduced during the actual operation of the fluidized bed to prevent caking and to eliminate any caked conditions. After the air injection to relieve caking or to prevent caking within the fluidized bed system, the bed is conditioned for short periods with iodine gas after the air injection, prior to employing parts within the bed, when such air injection would interfere with the disilicide coating operation.

One particular point which we emphasize in regard to the operation of the instant process is that the process is not restricted to the use of oxygen or air as an additive at insert 12 in the main argon line as shown by FIGURE 1. Nitrogen and oxygen generating materials, among other materials, can be used to form coatings on silicon particles in the fluidized bed. The element, compound, or mixture selected for the formation of the non-caking coating on silicon particles is dependent upon economics and upon the desired properties of the base metal or alloy and its siliconized coating. The injection of controlled amounts of oxygen into the fluidized gas stream of argon entering the plenum chamber is one of the simplest methods of achieving a non-caking coating on the silicon particles in the fluidized bed. Air could also be used; however, proper procedures have to be practiced with air supplies because of possible contaminants within the air supply which would produce reaction with the silicon bed, promoting later contamination of materials to be disilicide coated within the fluidized bed. Typical practice would be filtering the air supply before it enters the filtering plenum chamber 13.

The advantages of employing the instant invention can be readily realized when it was necessary, before the use of the instant invention, to change the silicon bed each time that severe caking was evident (normally after 20 to 30 hours of coating time). Such change of silicon within the fluidized bed is costly from a standpoint of material and manpower as well as operational time loss. This entailed cooling down the reactor, removing the old silicon from the reactor, recharging the reactor with a new silicon bed, conditioning the bed with iodine gas to remove any foreign matter entering the reactor during reloading. The changing of the silicon bed and reconditioning takes at least 12 hours; this amount of time is costly from a process standpoint. In addition there is a certain wear-and-tear factor upon the reactor walls of the fluidized bed. When it is realized that each time the reactor is cooled to room temperature coatings on the inside walls fall off. This phenomena is detrimental to the life of the reactor since it decreases the thickness of the reactor wall. The utilization of the instant invention allows extending the life of the silicon medium of the fluidized bed well beyond the 20 to 30 hours coating time normally experienced. The economics of this invention alone will readily allow its adaption to the fluidized processes.

While we have described and illustrated some preferred forms of my invention, it should be understood that many modifications may be made without departing from the spirit and scope of the invention, and it should therefore be understood that this invention is limited only by the scope of the appended claims.

We claim:

1. In the process of siliconizing metals which comprises the steps of:
    (a) forming a fluidization bed containing silicon particles at a temperature of about 1400° F. to 1900° F.;
    (b) introducing the metal to be siliconized into the fluidization bed;
    (c) introducing a halogen into the fluidization bed; and
    (d) reacting the halogen with the silicon particles in the fluidization bed to form a volatile compound which decomposes and coats the metal to be siliconized with a disilicon diffusion complex;
the improvement for preventing caking of the fluidization bed which comprises:
partially coating the silicon particles with an anti-friction coating formed by reacting the surface of the silicon particles with a gas selected from the group consisting of air, nitrogen, oxygen and mixtures thereof to render the silicon particles non-agglomerating.

2. The process of claim 1 wherein the step of partially coating the silicon particles with an anti-friction coating comprises:
(a) introducing the gas into the fluidization bed; and
(b) reacting the gas with the silicon particles in the fluidization bed to partially coat the silicon particles with an anti-friction coating to render the particles non-agglomerating.

3. The process of claim 2 wherein the gas is introduced into the fluidization bed before metal to be siliconized has been introduced into the fluidization bed.

References Cited

UNITED STATES PATENTS

| | | | |
|---|---|---|---|
| 1,562,821 | 11/1925 | Bunds | 117 |
| 2,414,625 | 1/1947 | Abrams et al. | 117—100 X |
| 2,729,598 | 1/1956 | Garbo | 117 |
| 2,901,317 | 8/1959 | Marti | 117—100 X |
| 2,978,316 | 4/1961 | Weir | 117 |
| 3,012,862 | 12/1961 | Bertrand et al. | 117—100 X |
| 3,053,704 | 9/1962 | Munday | 117 |
| 3,097,958 | 7/1963 | Morris | 117 |
| 3,231,408 | 1/1966 | Huddle | 117—100 X |
| 3,247,014 | 4/1966 | Goldberger et al. | 117—100 |
| 3,249,462 | 5/1966 | Jurg et al. | 117—135.1 X |
| 3,307,964 | 3/1967 | Jacobson | 117—135.1 |

WILLIAM D. MARTIN, *Primary Examiner.*

EDWARD J. CABIC, *Assistant Examiner.*

U.S. Cl. X.R.

117—100, 118, 135.1